United States Patent
Ooi et al.

(10) Patent No.: US 9,726,826 B2
(45) Date of Patent: Aug. 8, 2017

(54) INTER-LENS ADJUSTING METHOD AND PHOTOELECTRIC HYBRID SUBSTRATE

(71) Applicant: FUJITSU LIMITED, Kawasaki-shi, Kanagawa (JP)

(72) Inventors: Takahiro Ooi, Kawasaki (JP); Michihiro Takamatsu, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/975,921

(22) Filed: Dec. 21, 2015

(65) Prior Publication Data
US 2016/0209596 A1    Jul. 21, 2016

(30) Foreign Application Priority Data
Jan. 21, 2015 (JP) .................... 2015-009841

(51) Int. Cl.
*G02B 6/42* (2006.01)
*G02B 6/32* (2006.01)
*G02B 6/26* (2006.01)

(52) U.S. Cl.
CPC ............. *G02B 6/322* (2013.01); *G02B 6/423* (2013.01); *G02B 6/4204* (2013.01); *G02B 6/4249* (2013.01); *G02B 6/4292* (2013.01)

(58) Field of Classification Search
CPC .................................................. G02B 6/322
See application file for complete search history.

(56) References Cited

U.S. PATENT DOCUMENTS

| | | | | |
|---|---|---|---|---|
| 6,095,697 A | * | 8/2000 | Lehman | G02B 6/423 385/88 |
| 6,198,864 B1 | * | 3/2001 | Lemoff | G02B 6/29367 385/24 |
| 6,255,724 B1 | * | 7/2001 | Ambrosy | G02B 6/423 257/432 |
| 6,373,635 B1 | * | 4/2002 | Fujimoto | B29D 11/00278 359/619 |
| 6,449,099 B2 | * | 9/2002 | Fujimoto | G02B 3/0075 359/619 |
| 6,493,489 B2 | * | 12/2002 | Mertz | G02B 6/4292 385/33 |
| 6,693,748 B1 | * | 2/2004 | Fujimoto | G02B 3/0025 359/621 |

(Continued)

FOREIGN PATENT DOCUMENTS

JP     09-243867    9/1997
JP     10-031138    2/1998

*Primary Examiner* — Rhonda Peace
(74) *Attorney, Agent, or Firm* — Fujitsu Patent Center

(57) ABSTRACT

An inter-lens adjusting method includes: fitting a plurality of fitting portions to a plurality of fitted portions, wherein each of the plurality of fitting portions is provided on the side of a first lens for collimating light emitted from a light emitting device and includes at least one of a convex portion and a concave portion and each of the plurality of fitted portions is provided on the side of a second lens for aggregating the light collimated by the first lens and has a shape to be fitted to a corresponding one of the plurality of fitting portions; and adjusting a position between the first lens and the second lens such that the light emitted from the light emitting device is aggregated into an optical fiber ferrule via the first lens and the second lens.

17 Claims, 18 Drawing Sheets

(56) References Cited

U.S. PATENT DOCUMENTS

| | | | | |
|---|---|---|---|---|
| 6,707,613 B2* | 3/2004 | Fujimoto | | B41J 2/451 |
| | | | | 359/619 |
| 6,870,976 B2* | 3/2005 | Chen | | G02B 6/29367 |
| | | | | 264/1.1 |
| 6,973,248 B2* | 12/2005 | Kropp | | G02B 6/30 |
| | | | | 385/131 |
| 7,421,160 B1* | 9/2008 | Budd | | G02B 6/30 |
| | | | | 385/129 |
| 7,720,337 B2* | 5/2010 | Lu | | G02B 6/4231 |
| | | | | 385/52 |
| 7,859,757 B2* | 12/2010 | Yamamura | | B41J 2/451 |
| | | | | 359/621 |
| 8,098,437 B2* | 1/2012 | Chan | | G02B 3/0025 |
| | | | | 359/455 |
| 8,600,236 B2* | 12/2013 | Shin | | G02B 6/4206 |
| | | | | 398/135 |
| 8,714,838 B2* | 5/2014 | Son | | G02B 6/4206 |
| | | | | 385/89 |
| 9,014,519 B2* | 4/2015 | Mathai | | G02B 6/423 |
| | | | | 385/14 |
| 9,081,157 B2* | 7/2015 | Shin | | G02B 6/4206 |
| 9,429,711 B2* | 8/2016 | Nakagawa | | G02B 3/0006 |
| 2001/0028506 A1* | 10/2001 | Fujimoto | | B41J 2/451 |
| | | | | 359/622 |
| 2002/0064347 A1* | 5/2002 | Mertz | | G02B 6/4292 |
| | | | | 385/52 |
| 2002/0176172 A1* | 11/2002 | Nemoto | | B29C 65/562 |
| | | | | 359/619 |
| 2005/0185900 A1* | 8/2005 | Farr | | G02B 6/4214 |
| | | | | 385/93 |
| 2011/0222823 A1* | 9/2011 | Pitwon | | G02B 6/42 |
| | | | | 385/93 |
| 2014/0199019 A1* | 7/2014 | Yabre | | G02B 6/4206 |
| | | | | 385/14 |
| 2015/0323748 A1* | 11/2015 | Contag | | G02B 6/4239 |
| | | | | 385/77 |
| 2016/0209596 A1* | 7/2016 | Ooi | | G02B 6/322 |

* cited by examiner

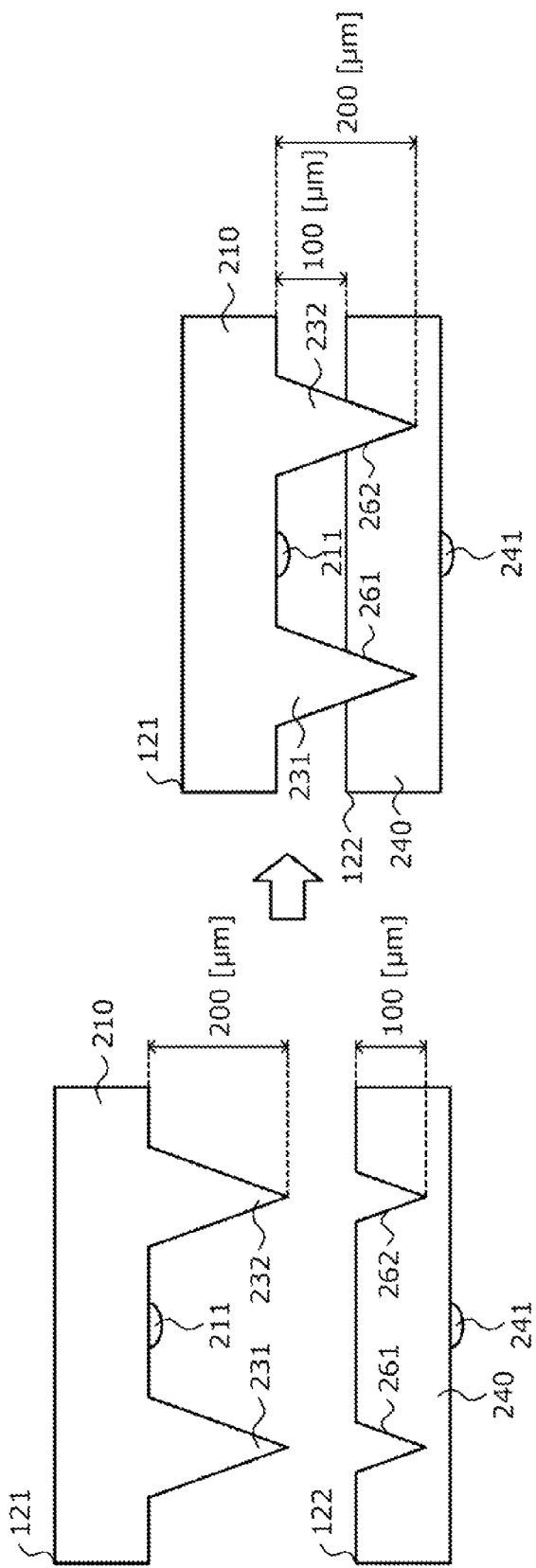

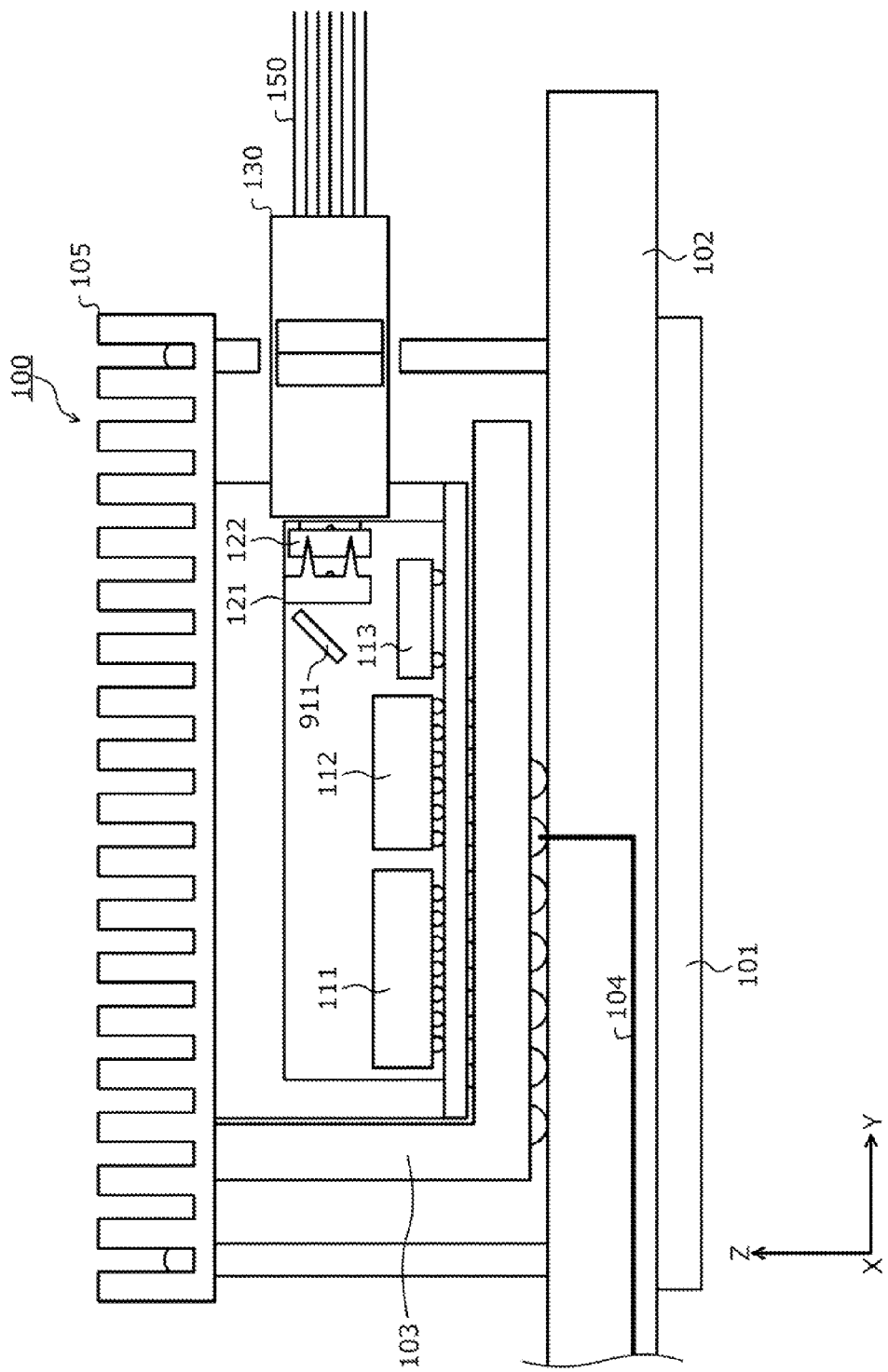

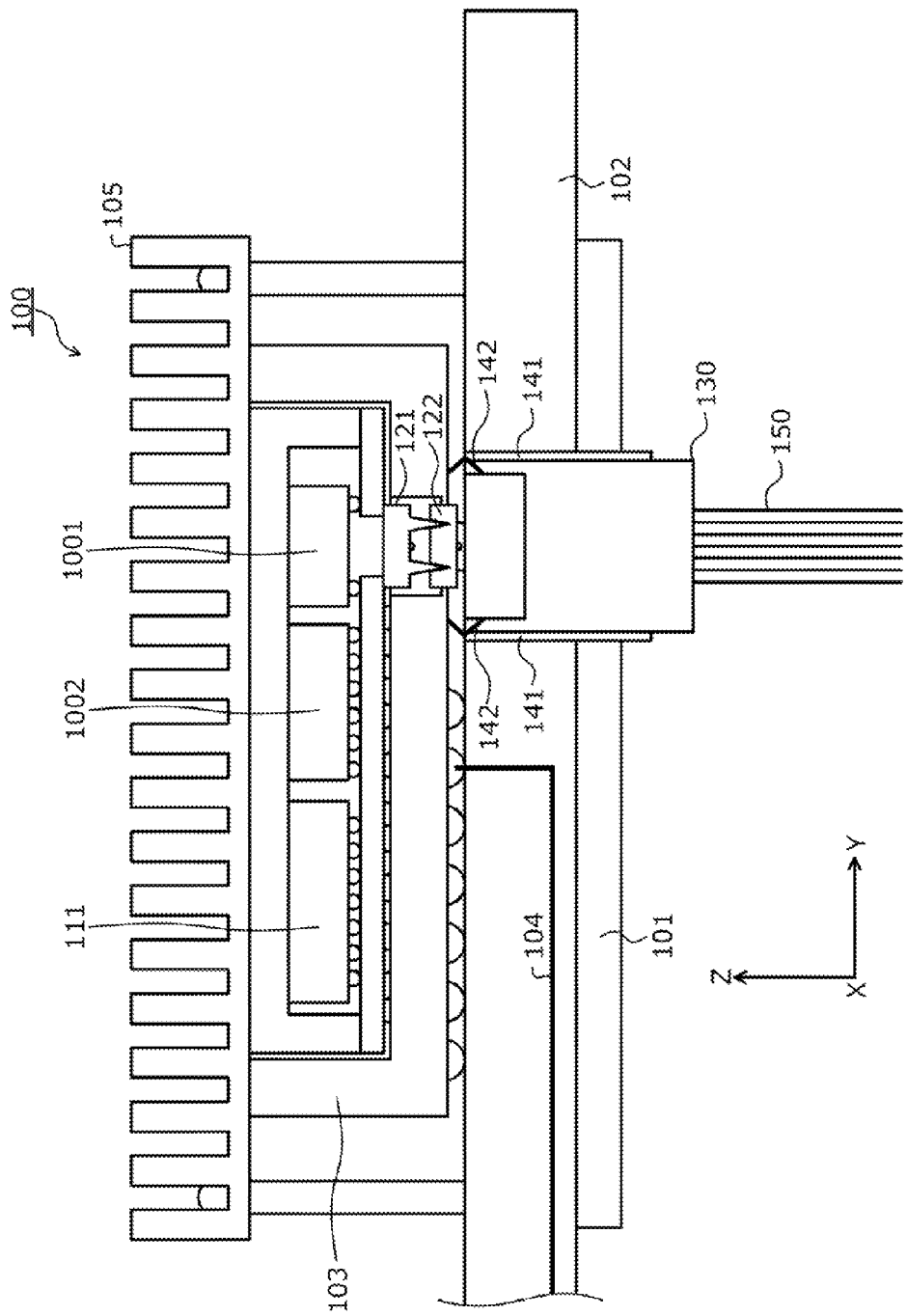

INTER-LENS ADJUSTING METHOD AND PHOTOELECTRIC HYBRID SUBSTRATE

CROSS-REFERENCE TO RELATED APPLICATION

This application is based upon and claims the benefit of priority from the prior Japanese Patent Application No. 2015-009841, filed on Jan. 21, 2015, the entire contents of which are incorporated herein by reference.

FIELD

The embodiments discussed herein are related to an inter-lens adjusting method and a photoelectric hybrid substrate.

BACKGROUND

When a photoelectric hybrid substrate is formed, adjustment is performed among a plurality of lenses.

Related techniques are disclosed in, for example, Japanese Laid-Open Patent Publication No. 10-031138 and Japanese Laid-Open Patent Publication No. 09-243867.

SUMMARY

According to one aspect of the embodiments, an inter-lens adjusting method includes: fitting a plurality of fitting portions to a plurality of fitted portions, wherein each of the plurality of fitting portions is provided on the side of a first lens for collimating light emitted from a light emitting device and includes at least one of a convex portion and a concave portion and each of the plurality of fitted portions is provided on the side of a second lens for aggregating the light collimated by the first lens and has a shape to be fitted to a corresponding one of the plurality of fitting portions; and adjusting a position between the first lens and the second lens such that the light emitted from the light emitting device is aggregated into an optical fiber ferrule via the first lens and the second lens.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 illustrates an example of adjustment of a space between lenses;

FIG. 9 illustrates an example of a photoelectric hybrid substrate;

FIG. 10 illustrates an example of a photoelectric hybrid substrate; and

DESCRIPTION OF EMBODIMENTS

An alignment jig having a protruding structure and guide pins fitting an alignment guide groove provided on a substrate to which a surface emission device is bonded is used to mount a silicon substrate in a package having guide pin holes.

In multi-core optical parts, aligned fixed guide pins and guide pin insertion holes to be fitted to the guide pins are used to align an optical module including a lens array with an optical fiber array.

For example, when a plurality of lenses is interposed between an optical device such as a light emitting device or a light receiving device and a ferrule, it may be difficult to perform an inter-lens adjustment due to a space between the plurality of lenses. And further, an optical loss between the optical device and the ferrule may increase.

Figure 1:
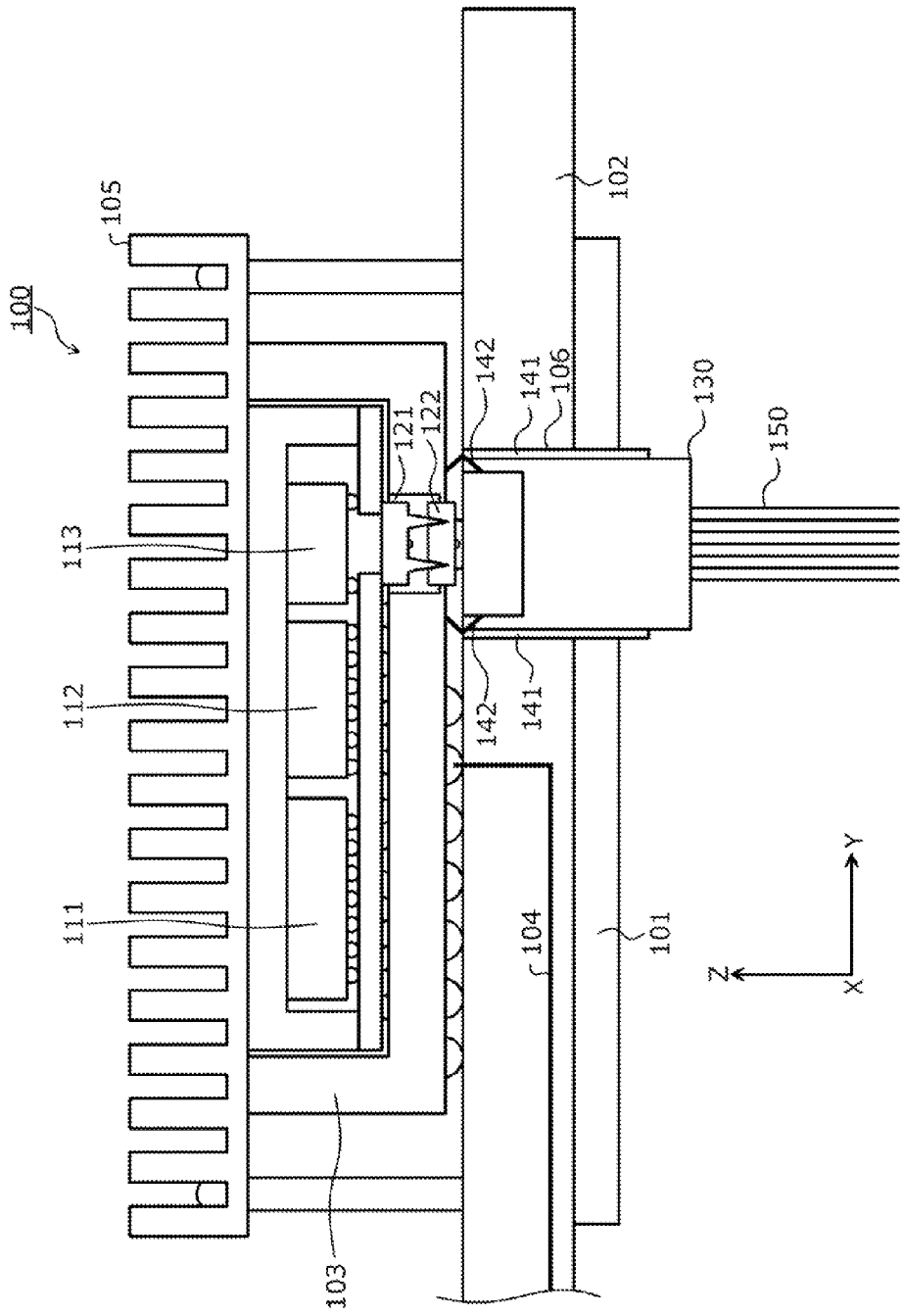
FIG. 1 illustrates an example of a photoelectric hybrid substrate.

FIG. 1 illustrates an example of a photoelectric hybrid substrate. A front view of the photoelectric hybrid substrate is illustrated in FIG. 1. As illustrated in FIG. 1, the photoelectric hybrid substrate 100 includes a plate 101, a photonic/electric hybrid board 102, a socket 103, fins 105, a micro IC 111, and a driver IC 112. The photoelectric hybrid substrate 100 further includes an optical device 113, lenses 121 and 122, a ferrule 130, and an optical fiber 150.

In FIG. 1, an X-axial direction and a Y-axial direction are each parallel to a mounting surface of the photonic/electric hybrid board 102 and are perpendicular to each other. A Z-axial direction is perpendicular to the mounting surface of the photonic/electric hybrid board 102. For example, in FIG. 1, the X axis, Y axis, and Z axis may be the depth direction, horizontal direction, and vertical direction, respectively.

The plate 101 may correspond to one side, for example, a bottom surface of a housing of the photoelectric hybrid substrate 100. The plate 101 may be a heat dissipating member for dissipating heat from the photonic/electric hybrid board 102. The photonic/electric hybrid board 102 is a mother board on which optical devices and electric circuits are mixedly provided. For example, the photonic/electric hybrid board 102 may be a printed circuit board (PCB). The socket 103 is installed on the mounting surface of the photonic/electric hybrid board 102 in parallel to the XY plane.

The socket 103 accommodates, for example, electric circuits and so on. The socket 103 is electrically coupled with other circuits provided on the photonic/electric hybrid board 102 via a bump and an electrical wiring 104 of the photonic/electric hybrid board 102. For example, the socket 103 may be a land grid array (LGA) socket. The socket 103 holds the micro IC 111, the driver IC 112, and the optical device 113. The fins 105 are heat dissipating fins for dissipating heat from each of electrical circuits provided in the socket 103.

The micro IC 111 is coupled to the photonic/electric hybrid board 102 via the socket 103. The micro IC 111 may be a control circuit for controlling the driver IC 112. For example, a digital circuit such as a digital signal processor (DSP) or the like may be used as the micro IC 111.

The driver IC 112 is coupled to the photonic/electric hybrid board 102 via the socket 103. The driver IC 112 may be a drive circuit for driving the optical device 113 by supplying a drive current to the optical device 113. The supply of the drive current to the optical device 113 by the driver IC 112 is performed under the control from the micro IC 111.

The optical device 113 is a light emitting device of a surface emission type for oscillating and emitting light in response to the drive current supplied from the driver IC 112. The optical device 113 is provided to emit the light in the minus (−) direction of the Z axis, for example, toward the photonic/electric hybrid board 102. The optical device 113 may be a single light emitting element or a light emitting element array in which a plurality of light emitting elements is arrayed in, for example, the X-axial direction. For example, a laser diode such as a vertical cavity surface emitting laser (VCSEL) may be used for the optical device 113.

When the lens 121 is installed in, for example, the socket 103, the relative position between the lens 121 and the optical device 113 is adjusted. The lens 121 collimates the light emitted from the optical device 113 and emits the collimated light to the lens 122. When the lens 122 is installed in the ferrule 130, the relative position between the lens 122 and the ferrule 130 is adjusted. The lens 122 aggregates (condenses) the light, which is emitted from the lens 121, into a light incident portion of the ferrule 130.

The ferrule 130 may be a connector which is installed at an end portion of the optical fiber 150 and coupled to the photonic/electric hybrid board 102. The ferrule 130 is inserted in an opening 106, which is formed in the photonic/electric hybrid board 102, in the Z-axial direction and is fixed to the photonic/electric hybrid board 102 by means of a spring mechanism 141 and a detent 142. The ferrule 130 couples the light, which is aggregated by the lens 122, to the core of the optical fiber 150. Accordingly, the light emitted from the optical device 113 is transmitted by the optical fiber 150.

If the optical device 113 is a single light emitting element, for example, a ferrule of a single core and an optical fiber may be used for the ferrule 130 and the optical fiber 150. If the optical device 113 is a light emitting element array, for example, a ferrule of multiple cores and optical fiber may be used for the ferrule 130 and the optical fiber 150.

Figure 2:
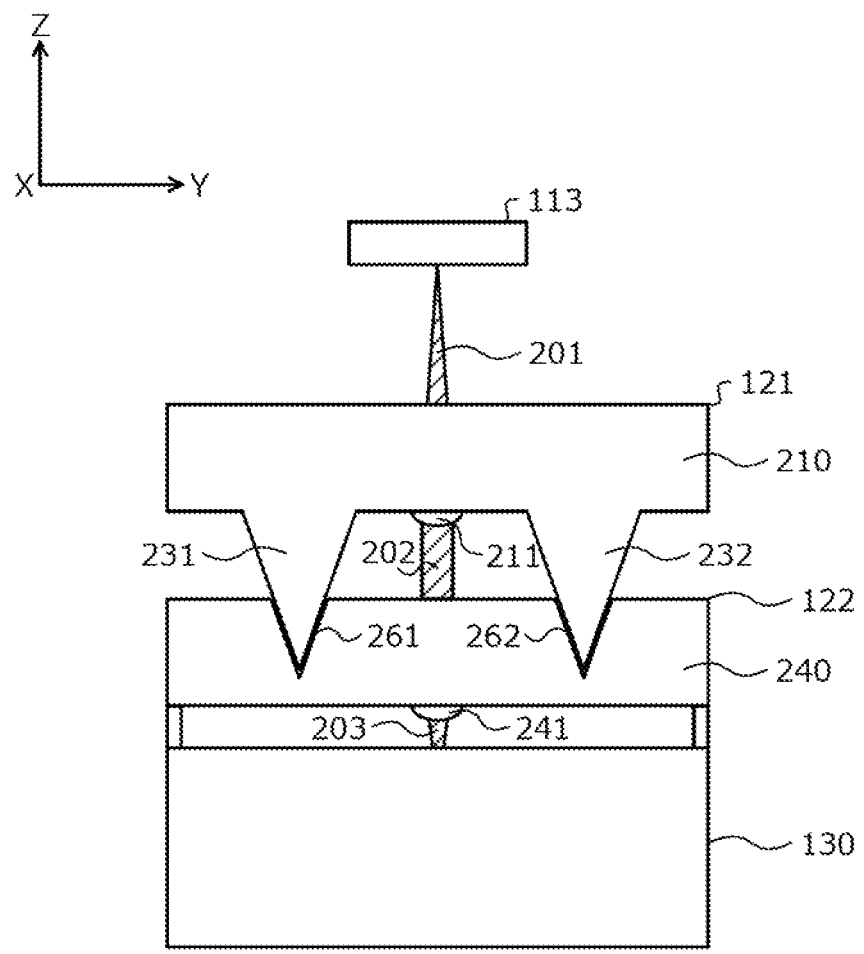
FIG. 2 illustrates an example of an optical device and a ferrule.

FIG. 2 illustrates one example of the optical device and the ferrule. A front view of each of the lenses between the optical device and the ferrule is illustrated in FIG. 2. In FIG. 2, the same elements as or similar elements to those illustrated in FIG. 1 are denoted by the same reference numerals and explanation of which may not be repeated. As illustrated in FIG. 2, the lens 121 at the side of the optical device 113 includes a body 210, a lens portion 211, and convex portions 231 and 232. The lens portion 211 and the convex portions 231 and 232 may be, for example, a transparent member made of glass, plastic, or the like, which is formed of the same material as the body 210 and is integrally formed with the body 210. For example, the lens 121 may be formed by molding the transparent member made of glass or plastic.

Light 201 may be emitted from the optical device 113 to the lens 121. The lens portion 211 collimates the light emitted from the optical device 113 and transmitted through the body 210 to emit the collimated light to the lens 122. Light 202 may be emitted from the lens portion 211 to the lens 122. Although in FIG. 2, the lens portion 211 is provided in the body 210 at the side of the lens 122, the lens portion 211 may also be provided in the body 210 at the side of the optical device 113.

The convex portions 231 and 232 are provided at the side of the lens 122 of the body 210 and serve as pins for an alignment and gap adjustment. The convex portions 231 and 231 may be a fitting portion to be fitted to the concave portions 261 and 262 of the lens 122. In FIG. 2, the convex portions 231 and 232 have a quadrangular pyramid shape projecting toward the lens 122.

The lens 122 at the side of the ferrule 130 includes a body 240, a lens portion 241, and the concave portions 261 and 262. The lens portion 241 and the concave portions 261 and 262 may be, for example, a transparent member made of glass, plastic, or the like, which is formed of the same material as the body 240 and is integrally formed with the body 240. For example, the lens 122 may be formed by molding the transparent member made of glass or plastic.

The lens portion 241 aggregates light, which is emitted from the lens 121 and transmitted through the body 240, into the light incident portion of the ferrule 130. Light 203 may be emitted from the lens portion 241 to the ferrule 130. Although it is illustrated in FIG. 2 that the lens portion 241 is provided in the body 240 at the side of the ferrule 130, the lens portion 241 may also be provided in the body 240 at the side of the lens 121.

The concave portions 261 and 262 are holes formed in the body 240 at the side of the lens 121 and may be serving as fitted portions to be fitted to the convex portions 231 and 232 of the lens 121. For example, the concave portions 261 and 262 are fitted with the convex portions 231 and 232, respectively. The concave portions 261 and 262 have a shape complementary to the shape of the convex portions 231 and 232. In FIG. 2, the concave portions 261 and 262 may have a quadrangular pyramid shape corresponding to the tips of the convex portions 231 and 232 of the lens 121.

When the tips of the convex portions 231 and 232 are fitted into the concave portions 261 and 262, respectively, the relative position between the lens 121 and the lens 122 is determined. For example, the relative position between the lens 121 and the lens 122 includes relative positions in the Z-axial direction, the Y-axial direction, the X-axial direction, the rotational direction around the Z axis, the rotational direction around the Y axis, and the rotational direction around the X axis.

In FIG. 1, the ferrule 130 is coupled in the Z-axial direction via the opening 106 formed in the photonic/electric hybrid board 102, so that the light emitted vertically from the optical device 113 of the surface emission type may be able to enter the ferrule 130 even without performing, for example, an optical path conversion that uses a mirror or the like. As a result, for example, an optical loss caused by such use of a mirror or the like may be reduced.

When the ferrule 130 is connected in the Z-axial direction via the opening 106 formed in the photonic/electric hybrid board 102, it may be difficult to visually recognize the positional relationship between the lenses 121 and 122. In contrast, when the tips of the convex portions 231 and 232 of the lens 121 are respectively fitted into the concave portions 261 and 262 of the lens 122, the relative position between the lenses 121 and 122 is adjusted with a high accuracy. This can also reduce an optical loss between the optical device 113 and the ferrule 130.

When the lenses 121 and 122 are used in combination, the light is collimated between the optical device 113 and the ferrule 130, thereby allowing a distance between the optical device 113 and the ferrule 130 to be flexibly designed.

It is sufficient that the lenses 121 and 122 may simply fit with each other. For example, the lenses 121 and 122 may not be bonded to each other.

Figure 3A:
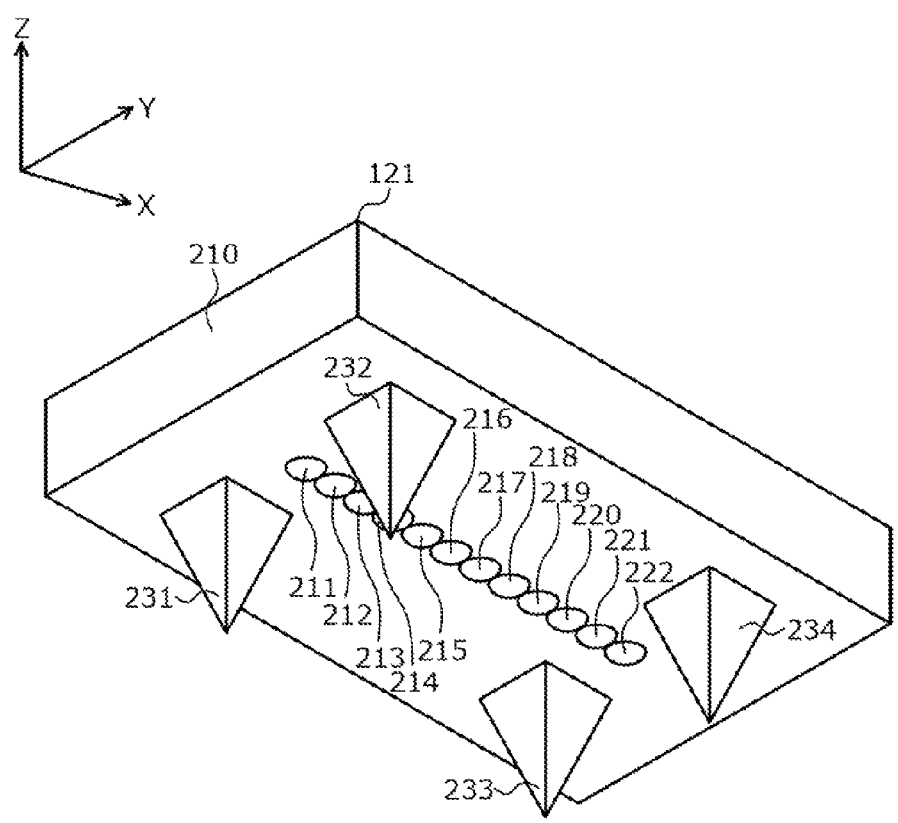
FIG. 3A illustrates an example of a perspective view of a lens of an optical device side.
Figure 3B:
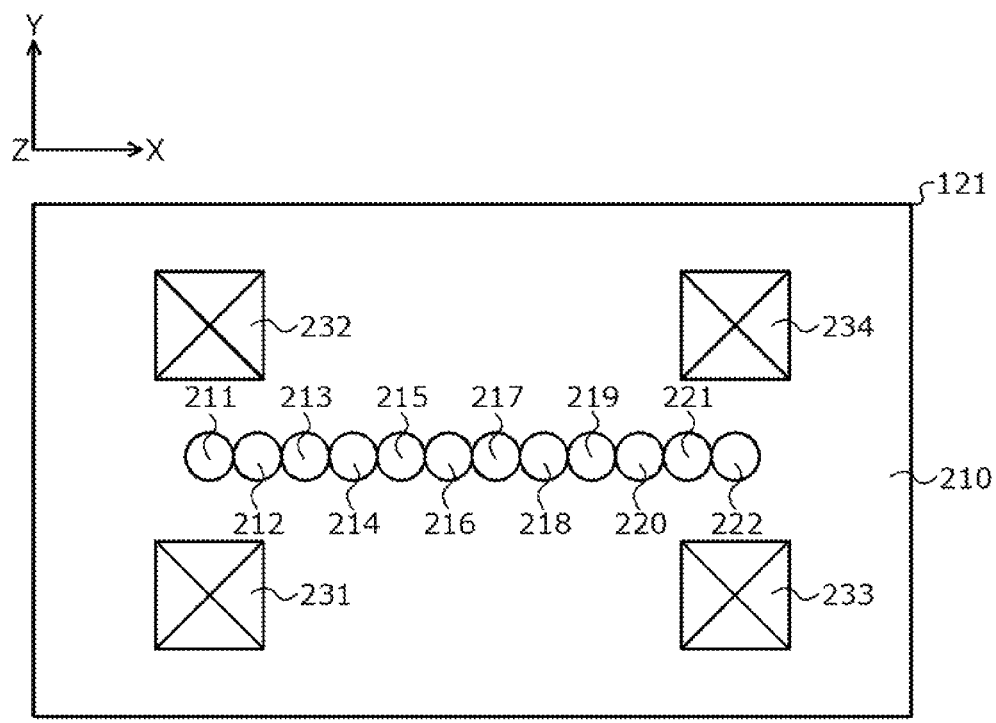
FIG. 3B illustrates an example of a bottom view of the lens of the optical device side.
Figure 3C:
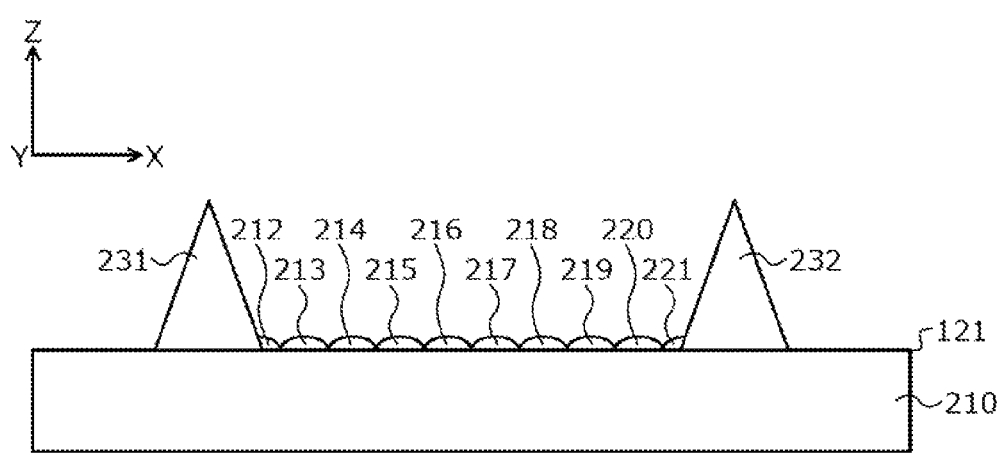
FIG. 3C illustrates an example of a front view of the lens of the optical device side.
Figure 3D:
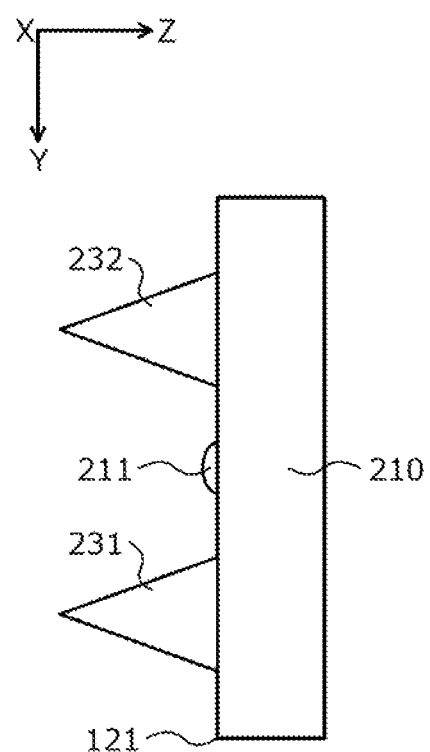
FIG. 3D illustrates an example of a side view of the lens of the optical device side.

FIG. 3A illustrates an example of a perspective view of the lens of the optical device side. FIG. 3B illustrates one example of a bottom view of the lens of the optical device side. FIG. 3C illustrates an example of a front view of the lens of the optical device side. FIG. 3D illustrates an example of a side view of the lens of the optical device side. In FIGS. 3A to 3D, the same elements and portions as or similar elements and portions to those illustrated in FIG. 2 are denoted by the same reference numerals and explanation of which may not be repeated.

In FIGS. 3A to 3D, the lens 121 at the side of the optical device 113 includes twelve (12) lens portions 211 to 222 and four (4) convex portions 231 to 234. In this case, the optical device 113 may be, for example, a light emitting element array in which twelve (12) light emitting elements are arrayed. Each of the lens portions 211 to 222 collimates the light emitted from the light emitting element array and emits the collimated light to the lens 122. The convex portions 231 to 234 are respectively formed near four corners of the surface of the body 210 on which the lens portions 211 to 222 are formed.

Although the lens 121 may include the twelve (12) lens portions 211 to 222, the number of lens portions of the lens 121 is optional and lens portions corresponding to the number of light emitting elements included in the optical device 113 may be provided.

Although the lens portions of the lens 121 may be arrayed in a row, the arrangement method of the lens portions of the lens 121 is optional and may correspond to an array of light emitting elements included in the optical device 113.

Figure 4A:
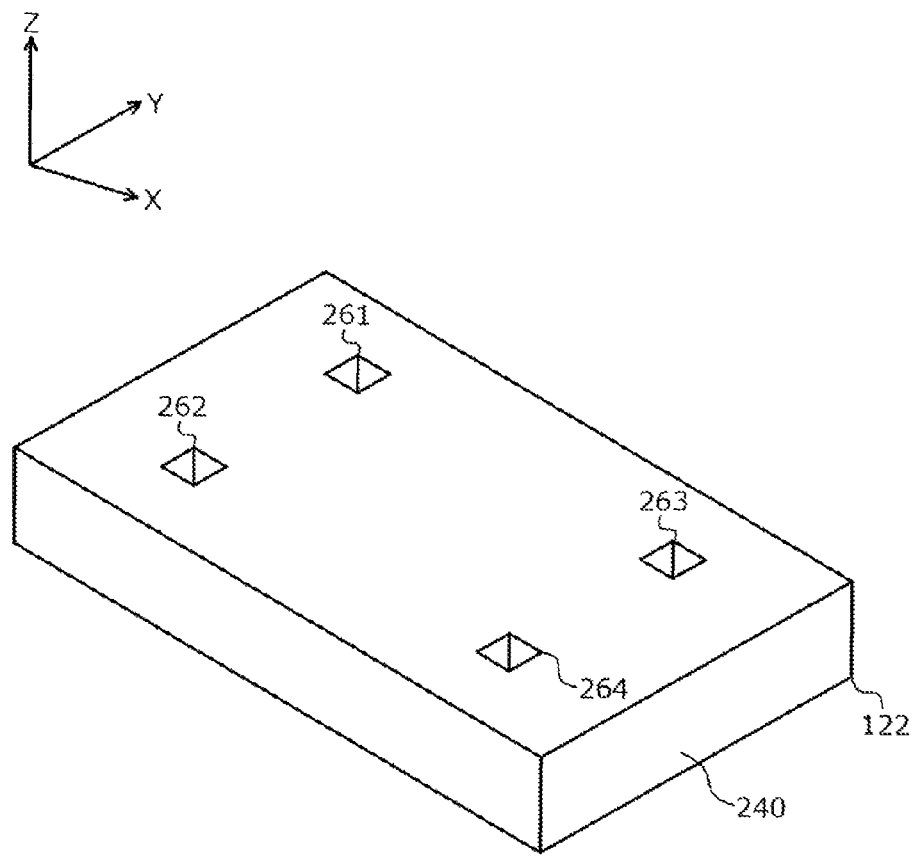
FIG. 4A illustrates an example of a perspective view of a lens of a ferrule side.
Figure 4B:
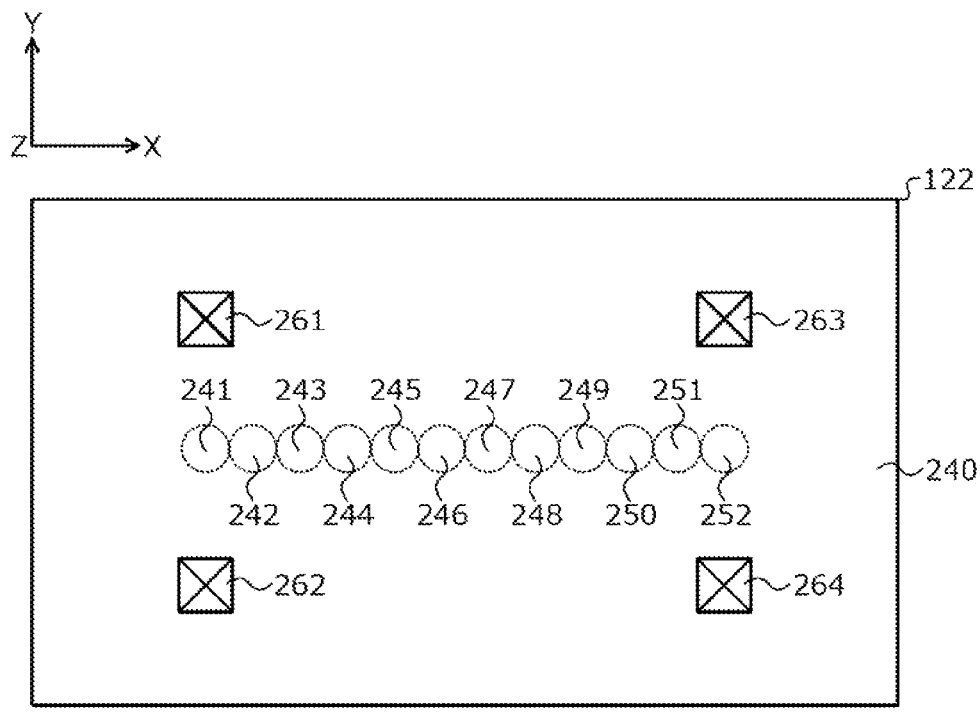
FIG. 4B illustrates an example of a top view of the lens of the ferrule side.
Figure 4C:
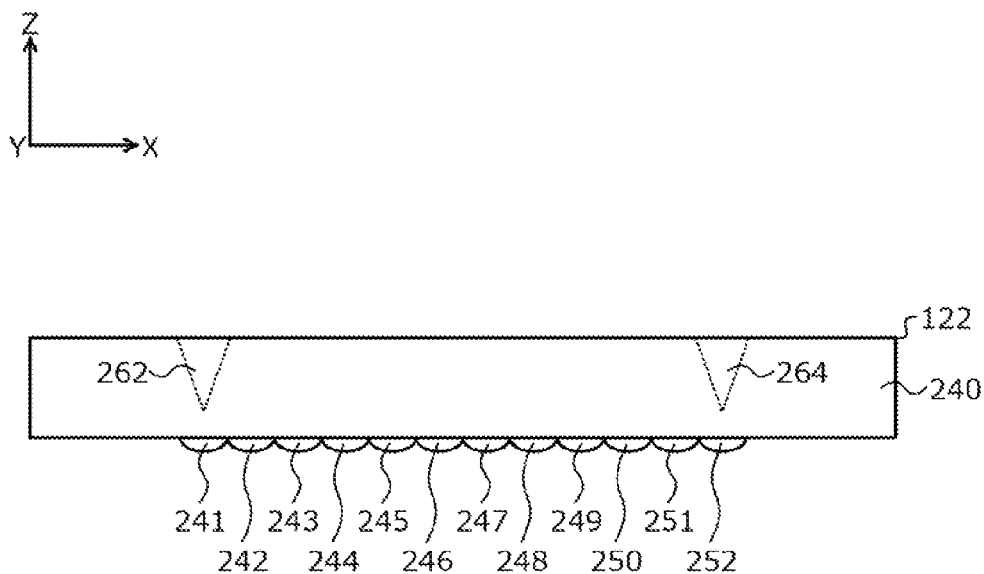
FIG. 4C illustrates an example of a front view of the lens of the ferrule side.
Figure 4D:
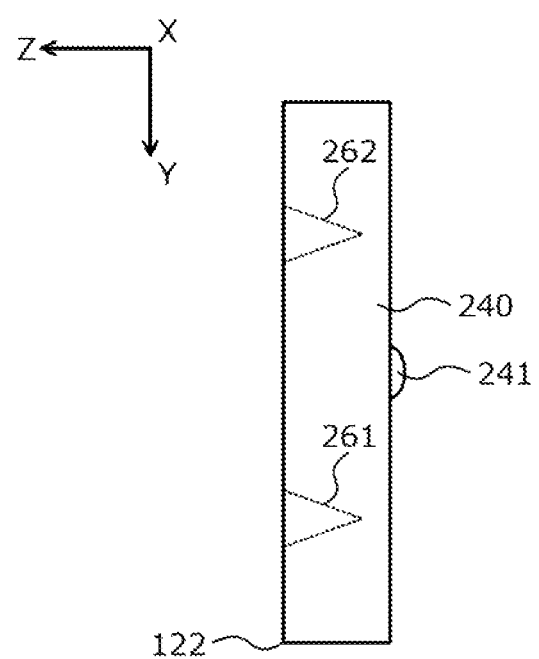
FIG. 4D illustrates an example of a side view of the lens of the ferrule side.

FIG. 4A illustrates an example of a perspective view of the lens of the ferrule side. FIG. 4B illustrates an example of a top view of the lens of the ferrule side. FIG. 4C illustrates an example of a front view of the lens of the ferrule side. FIG. 4D illustrates an example of a side view of the lens of the ferrule side. In FIGS. 4A to 4D, the same elements and portions as or similar elements and portions to those illustrated in FIG. 2 are denoted by the same reference numerals and explanation of which may not be repeated. As illustrated in FIGS. 4A to 4D, the lens 122 at the ferrule 130 side includes twelve (12) lens portions 241 to 252 and four (4) concave portions 261 to 264. FIG. 4A illustrates a perspective view of the top side of the lens 122. As illustrated in FIGS. 4B to 4D, the lens portions 241 to 252 are formed on the bottom surface of the lens 122.

Each of the lens portions 241 to 252 aggregates light, which is emitted from the lens portions 211 to 222 (see, e.g., FIGS. 3A to 3D) of the lens 121, into the light incident portion of the ferrule 130. The light incident portion of the ferrule 130 may be, for example, an end portion of each of twelve (12) cores of the ferrule 130. The concave portions 261 to 264 are respectively formed at positions where the concave portions 261 to 264 fit the convex portions 231 to 234 formed on the top surface of the body 210 illustrated in FIGS. 3A to 3D.

FIG. 5 illustrates an example of adjustment of a space between the lenses. In FIG. 5, the same elements and portions as or similar elements and portions to those illustrated in FIG. 2 are denoted by the same reference numerals and explanation of which may not be repeated. For example, a space (e.g., distance in the Z-axial direction) between the body 210 of the lens 121 and the body 240 of the lens 122 may be adjusted to 100 μm.

For example, as illustrated in the left side of FIG. 5, each of the convex portions, for example, each of the convex portions 231 and 232 illustrated in FIG. 5 are designed such that their height is 200 μm. The height of each convex portion corresponds to a distance between the tip of each convex portion and the surface of the body 210 on which each convex portion is formed. Each of the concave portions, for example, each of the concave portions 261 and 262 illustrated in FIG. 5 are designed such that their depth is 100 μm. The depth of each concave portion corresponds to a distance between the bottom of each concave portion and the surface of the body 240 on which each concave portion is formed.

When the concave portions of the lens 122 are respectively fitted to the tips of the convex portions of the lens 121, the space (e.g., distance in the Z-axial direction) between the body 210 of the lens 121 and the body 240 of the lens 122 is set to 100 μm, as illustrated in the right side of FIG. 5.

In this manner, the distance between a portion transmitting the light of the lens 121 and a portion transmitting the light of the lens 122 is adjusted according to the dimensions of the convex portions 231 and 232 of the lens 121 and the dimensions of the concave portions 261 and 262 of the lens 122.

Since the convex portions 231 and 232 are integrated with the body 210 and the concave portions 261 and 262 are integrated with the body 240, the dimensions of the convex portions 231 and 232 and the dimensions of the concave portions 261 and 262 may be adjusted with a high accuracy. Therefore, the distance between the portion transmitting the light of the lens 121 and the portion transmitting the light of the lens 122 may also be adjusted with a high accuracy.

Figure 6A:
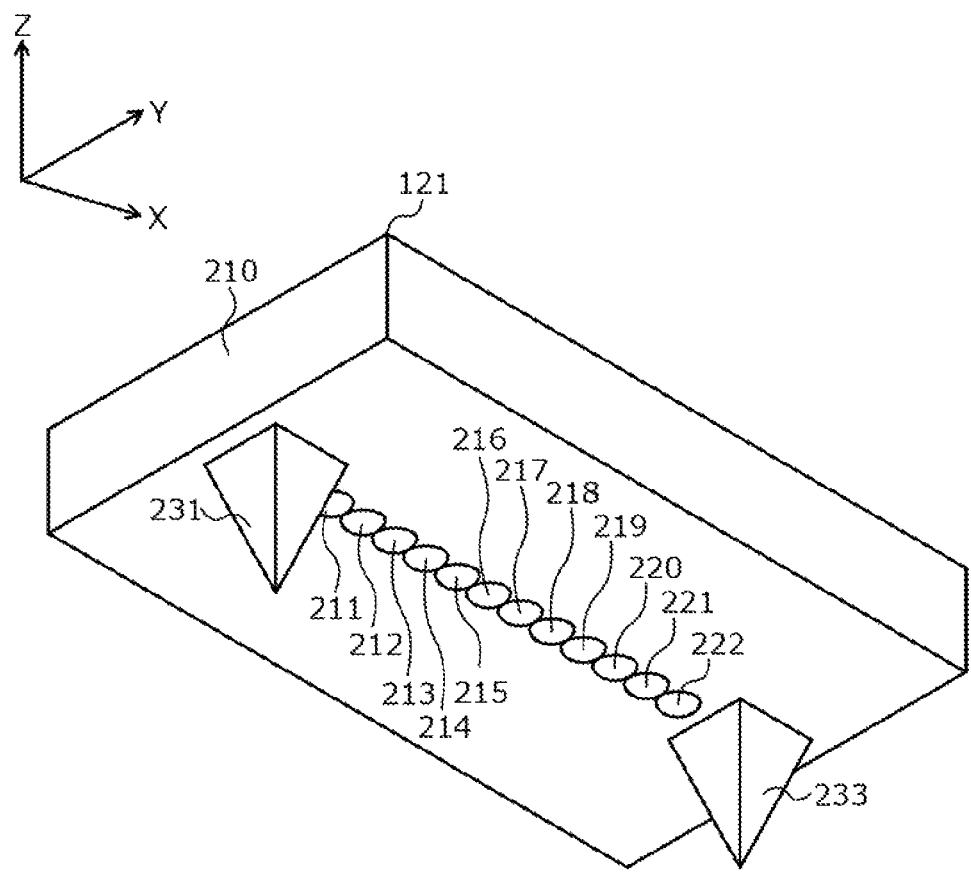
FIG. 6A illustrates an example of a perspective view of a lens of the optical device side.
Figure 6B:
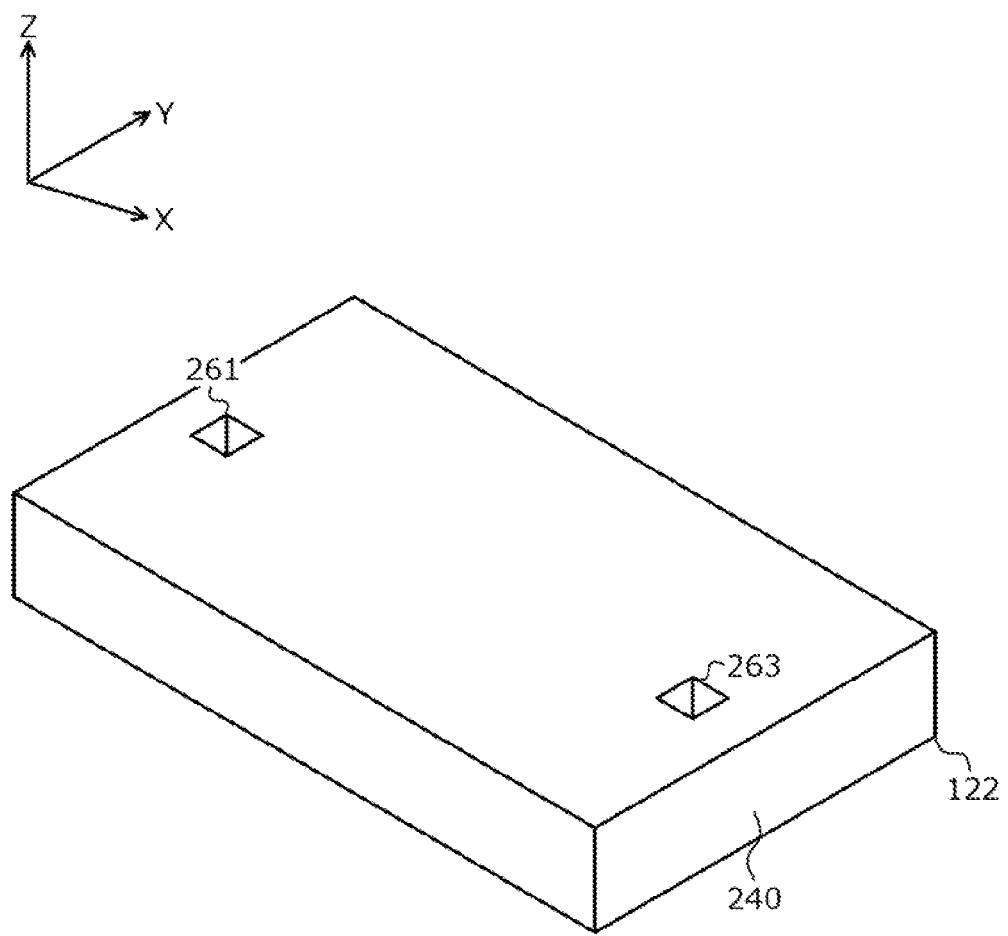
FIG. 6B illustrates an example of a perspective view of a lens of the ferrule side.

FIG. 6A illustrates an example of a perspective view of a lens of the optical device side. FIG. 6B illustrates an example of a perspective view of a lens of the ferrule side. In FIGS. 6A and 6B, the same elements and portions as or similar elements and portions to those illustrated in FIGS. 3A and 4A are denoted by the same reference numerals and explanation of which may not be repeated. The lens 121 at the side of the optical device 113 and the lens 122 at the side of the ferrule 130 may have the shapes illustrated in FIGS. 6A and 6B, respectively.

In FIGS. 3A to 3D and FIGS. 4A to 4D, four (4) convex portions 231 to 234 are formed in the lens 121. As illustrated in FIG. 6A, two (2) convex portions 231 and 233 may be formed in the lens 121. As illustrated in FIG. 6B, two (2) concave portions 261 and 263 into which the tips of the convex portions 231 and 233 are fitted, respectively, may be formed in the lens 122.

The number of convex portions of the lens 121 and the number of concave portions of the lens 122 are not limited to four (4) or two (2) but may be, for example, three (3) or five (5) or more. When a plurality of convex portions of the lens 121 and the corresponding number of concave portions of the lens 122 are formed, the relative position between the lenses 121 and 122 in each direction may be adjusted with a high accuracy.

Figure 7A:
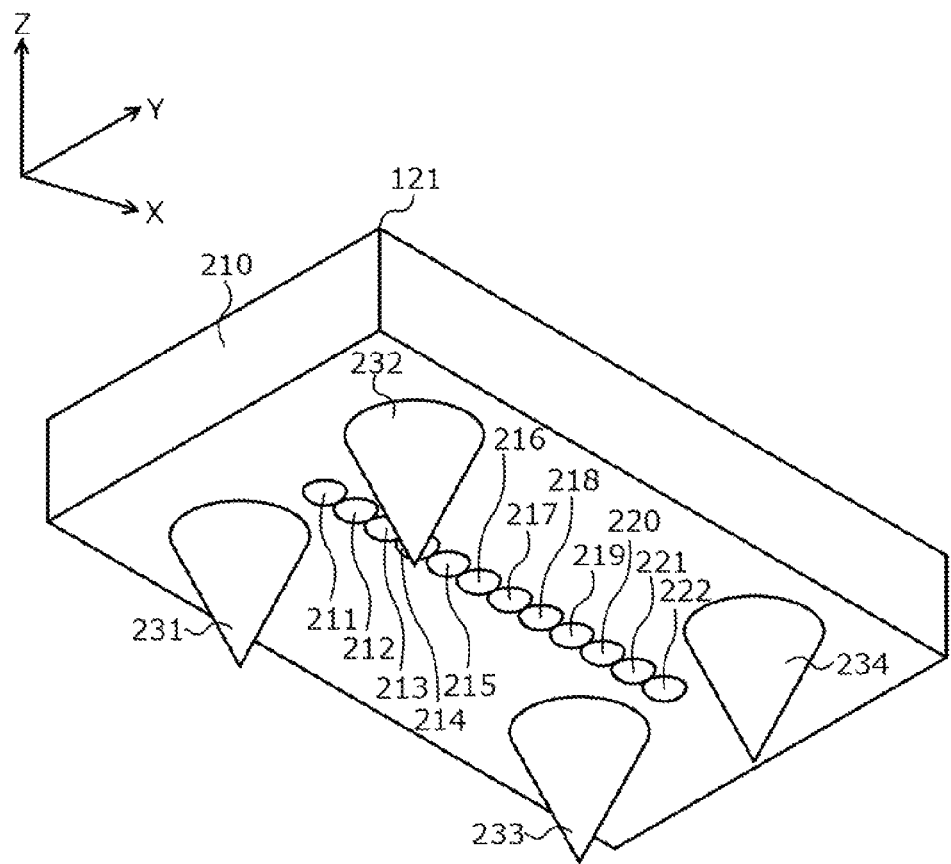
FIG. 7A illustrates an example of a perspective view of a lens of the optical device side.
Figure 7B:
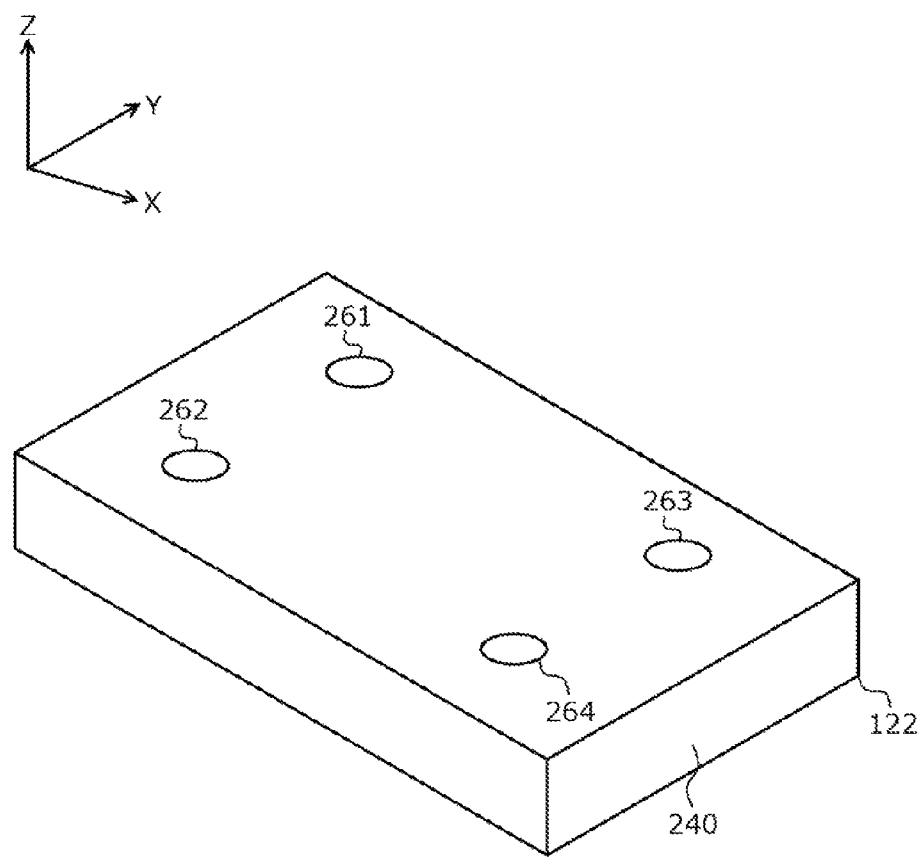
FIG. 7B illustrates an example of a perspective view of a lens of the ferrule side.

FIG. 7A illustrates an example of a perspective view of a lens of the optical device side. FIG. 7B illustrates an example of a perspective view of a lens of the ferrule side. In FIGS. 7A and 7B, the same elements and portions as or similar elements and portions to those illustrated in FIGS. 3A and 4A are denoted by the same reference numerals and explanation of which may not be repeated. The lens 121 at the side of the optical device 113 and the lens 122 at the side of the ferrule 130 may have the shapes illustrated in FIGS. 7A and 7B, respectively.

In FIGS. 3A to 3D and FIGS. 4A to 4D, quadrangular pyramidal convex portions 231 to 234 are formed in the lens 121. For example, as illustrated in FIG. 7A, conical convex portions 231 to 234 may be formed in the lens 121. As illustrated in FIG. 7B, conical concave portions 261 to 264 into which the tips of the convex portions 231 to 234 are fitted, respectively, may be formed in the lens 122.

The convex portions of the lens 121 and the concave portions of the lens 122 are not limited to the quadrangular pyramidal or conical shape but may have other shapes such as, for example, triangular pyramid, hemisphere and the like. For example, when each convex portion of the lens 121 has a shape which gets narrower as the convex portion gets closer to the tip thereof and each concave portion of the lens 122 has a shape which gets narrower as the concave portion gets closer to the bottom side thereof so as to fit the corresponding convex portion, the lenses 121 and 122 are easily fitted to each other. For example, the convex portions of the lens 121 and the concave portions of the lens 122 may have a shape of cylinder, triangular prism, quadrangular prism or the like.

Figure 8A:
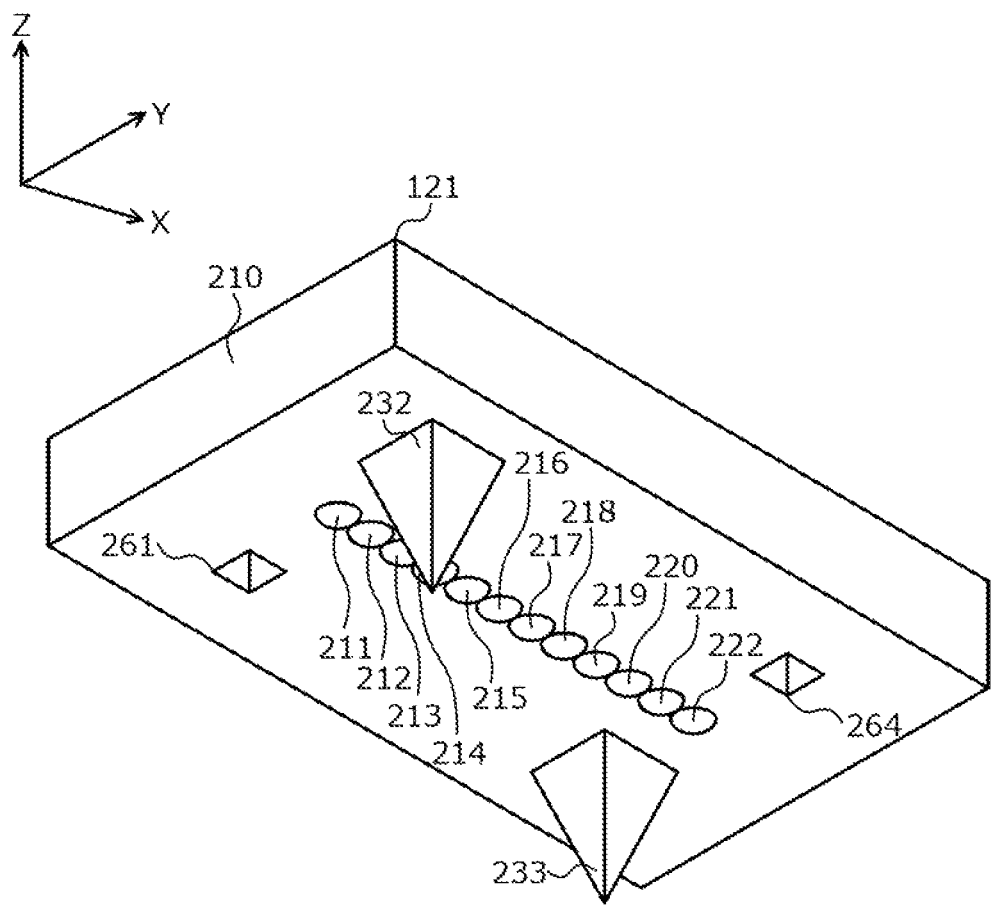
FIG. 8A illustrates an example of a perspective view of a lens of the optical device side.
Figure 8B:
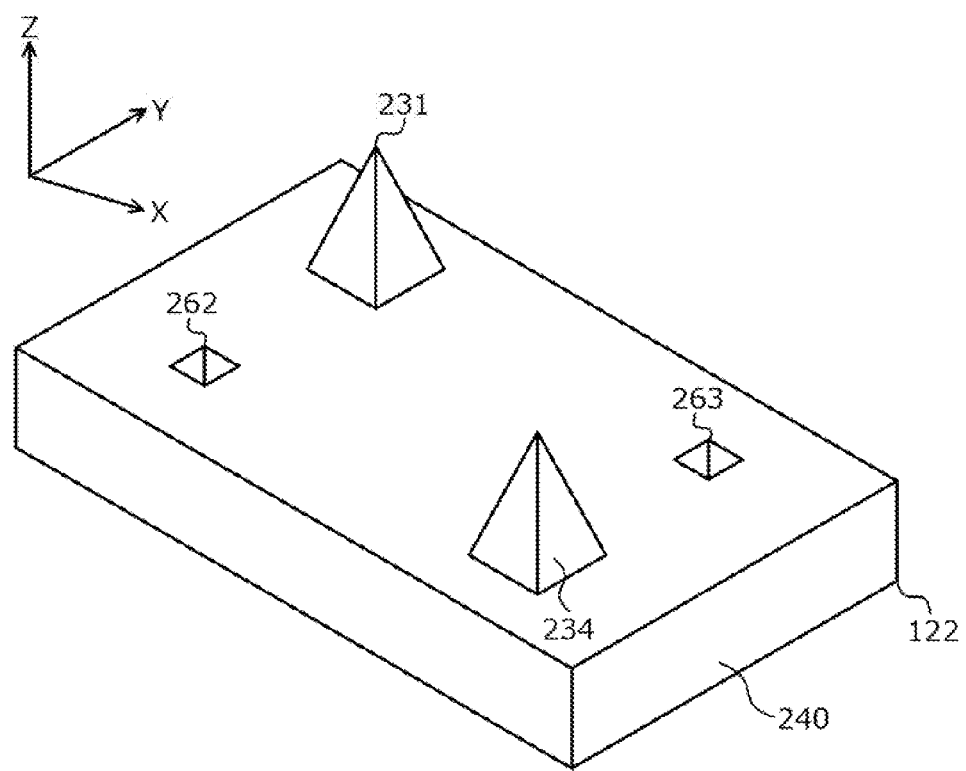
FIG. 8B illustrates an example of a perspective view of a lens of the ferrule side.

FIG. 8A illustrates an example of a perspective view of a lens of the optical device side. FIG. 8B illustrates an example of a perspective view of a lens of the ferrule side. In FIGS. 8A and 8B, the same elements and portions as or similar elements and portions as those illustrated in FIGS. 3A and 4A are denoted by the same reference numerals and explanation of which may not be repeated. The lens 121 at the side of the optical device 113 and the lens 122 at the side of the ferrule 130 may have the shapes illustrated in FIGS. 8A and 8B, respectively.

For example, in FIGS. 3A to 3D and FIGS. 4A to 4D, the convex portions 231 to 234 are formed in the lens 121 and the concave portions 261 to 264 are formed in the lens 122. For example, at least some of the convex portions and concave portions may be exchanged between the lenses 121 and 122. In FIGS. 8A and 8B, the convex portions 232 and 233 and the concave portions 261 and 264 are formed in the lens 121 and the convex portions 231 and 234 and the concave portions 262 and 263 are formed in the lens 122.

For example, the concave portions 261 to 264 may be formed in the lens 121 and the convex portions 231 to 234 may be formed in the lens 122.

The examples illustrated in FIGS. 6A to 8B may be combined. For example, two convex portions and two concave portions may be formed as illustrated in FIGS. 6A and 6B, and the shapes of the convex portions and concave portions may be conical as illustrated in FIGS. 7A and 7B. As another example, the shapes of convex portions and concave portions may be conical as illustrated in FIGS. 7A and 7B, and at least some of the convex portions and concave portions may be exchanged between the lenses 121 and 122, as illustrated in FIGS. 8A and 8B.

Each of the convex portions may have substantially the same length (height) in the Z-axial direction or shape or may have different height or shape. For example, the length (depth) in the Z-axial direction or shape of each of the concave portions may be designed such that each of the concave portions is fitted to the corresponding convex portion.

FIG. 9 illustrates an example of a photoelectric hybrid substrate. A front view of the photoelectric hybrid substrate is illustrated in FIG. 9. In FIG. 9, the same elements and portions as or similar elements and portions to those illustrated in FIG. 1 are denoted by the same reference numerals and explanation of which may not be repeated. In the photoelectric hybrid substrate 100 illustrated in FIG. 9, the ferrule 130 is connected to the socket 103 of the photonic/electric hybrid board 102 from the Y-axial direction.

In this case, the ferrule 130 is coupled without providing any opening for the photonic/electric hybrid board 102. The optical device 113 is disposed to emit the light in the plus (+) direction of the Z axis. For example, a mirror 911 is disposed at a position where the light emitted from the optical device 113 is incident with an incident angle of 45 degrees. The mirror 911 reflects and emits the light, which is emitted from the optical device 113 in the plus (+) direction of the Z axis, in the Y-axial direction. The lens 121 collimates the light emitted from the mirror 911 and emits the collimated light to the lens 122.

In FIG. 9, when the fitting portions, for example, the convex portions 231 and 232 of the lens 121 are fitted into the fitted portions, for example, the concave portions 261 and 262 of the lens 122, respectively, the relative position between the lenses 121 and 122 is adjusted.

FIG. 10 illustrates an example of a photoelectric hybrid substrate. A front view of the photoelectric hybrid substrate is illustrated in FIG. 10. In FIG. 10, the same elements and portions as or similar elements and portions to those illustrated in FIG. 1 are denoted by the same reference numerals and explanation of which may not be repeated. As illustrated in FIG. 10, the photoelectric hybrid substrate 100 includes an optical device 1001 and a receiver circuit 1002 instead of the optical device 113 and the driver IC 112 illustrated in FIG. 1.

The optical fiber 150 transmits light from the outside of the photoelectric hybrid substrate 100 and emits the light to the ferrule 130. The ferrule 130 emits the light, which is emitted from the optical fiber 150, to the lens 122. The lens 122 collimates the light emitted from the ferrule 130 and emits the collimated light to the lens 121. The lens 121 aggregates the light, which is emitted from the lens 122, into a light receiving portion of the optical device 1001.

The optical device 1001 may be a light receiving device which receives the light aggregated by the lens 121 and outputs an electric signal corresponding to the received light to the receiver circuit 1002. The optical device 1001 may include a single light receiving element or a light receiving element array in which a plurality of light receiving elements is arrayed. A photodiode may be used for the receiver circuit 1002.

The receiver circuit 1002 converts the analog electric signal, which is output from the optical device 1001, to a digital electric signal, and then outputs the converted signal to the micro IC 111. The micro IC 111 performs a process based on the digital electric signal output from the receiver circuit 1002.

In FIG. 10, the lenses 121 and 122 may have the above-described shapes. Therefore, when the fitting portions, for example, the convex portions 231 and 232 of the lens 121 are fitted into the fitted portions, for example, the concave portions 261 and 262 of the lens 122, respectively, the relative position between the lenses 121 and 122 is adjusted.

In FIG. 10, as illustrated in FIG. 9, the ferrule 130 may be coupled to the socket 103 of the photonic/electric hybrid board 102 from the Y-axial direction.

Figure 11:
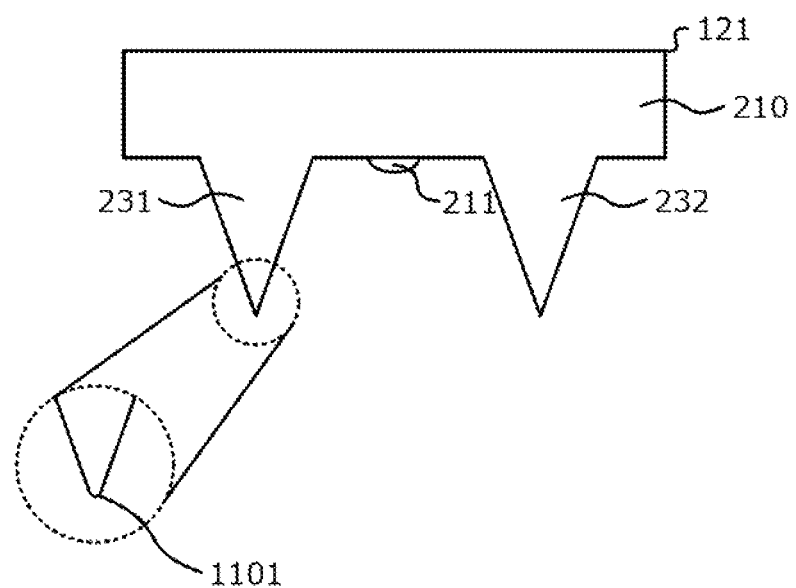
FIG. 11 illustrates an example of the shape of tips of convex portions of a lens.

FIG. 11 illustrates an example of the shape of tips of convex portions of a lens. A front view of the shape of the tips of the convex portions of the lens is illustrated in FIG. 11. In FIG. 11, the same elements and portions as or similar elements and portions to those illustrated in FIG. 2 are denoted by the same reference numerals and explanation of which may not be repeated. As illustrated in FIG. 11, the tips 1101 of the convex portions 231 may have a spherical surface. When the lens 121 is fitted to the lens 122, it may be reduced that the tips 1101 of the convex portions 231 cuts the concave portions 261 or their periphery. Therefore, a damage of the lens 122 or an occurrence of deviation of the relative position between the lenses 121 and 122 may be reduced.

The tips of the convex portions 232 illustrated in FIG. 2 and the tips of the convex portions 231 to 234 illustrated in FIGS. 3A to 3D, 6A, 7A and 8A may have the same shape as or similar shape to those of FIG. 11.

When the fitting portions, for example, the convex portions 231 and 232 of the lens 121 are fitted into the fitted portions, the concave portions 261 and 262, of the lens 122, respectively, the relative position between the lenses 121 and 122 is adjusted. For example, the relative position between the lenses 121 and 122 is precisely adjusted so that the light emitted from the optical device 113 (see, e.g., FIG. 1) is aggregated into the ferrule 130. Therefore, it is possible to reduce an optical loss caused by misalignment or a gap deviation of the lenses 121 and 122 between the optical device 113 and the ferrule 130.

The relative position between the lenses 121 and 122 is precisely adjusted so that the light emitted from the ferrule 130 is aggregated into the optical device 1001. Therefore, it is possible to reduce an optical loss caused by misalignment or a gap deviation of the lenses 121 and 122 between the ferrule 130 and the optical device 1001.

According to the above-described inter-lens adjusting method and photoelectric hybrid substrate, the optical loss between the optical device and the ferrule may be reduced.

With the advance of high speed and high density in printed circuit boards used for servers, supercomputers and so on, electrical wiring interconnection may not obtain sufficient characteristics due to the signal delay, attenuation, interference and the like. Therefore, electric signals may be converted to optical signals on the printed circuit boards to be propagated through a light waveguide. For example, a light waveguide including an optical path converter for propagating the optical signals is adhered to the front or rear layer of the printed circuit board and disposed.

In such optical transmission, for example, the light emitted from a light emitting device such as VCSEL or the like may be subjected to a 90 degree optical path conversion by means of a mirror and may be then propagated in an optical fiber. For example, with higher speed of electric signals, light power required for photoelectric conversion in a light receiving device becomes larger and an optical loss in an optical path converter becomes larger accordingly.

With higher speed of electric signals, since a light receiving unit is decreased to about 20 μm to 30 μm in diameter and receives light with high efficiency, an alignment between lenses, for example, between an optical module and an MT ferrule is performed. For example, when the light is collimated and propagated between the lenses, a certain degree of gap between the lenses is required, which may make it difficult to perform an inter-lens alignment.

For example, in the photoelectric hybrid substrate 100 illustrated in FIG. 1, since the ferrule 130 is directly coupled to the optical device 113 via the lenses 121 and 122, for example, without using a mirror, it is possible to reduce a loss of the optical path converter.

For example, when the convex portions 231 to 234 of the lens 121 are fitted to the concave portions 261 to 264 of the lens 122, respectively, the deviation of the relative position between the lenses 121 and 122 is reduced. For example, the relative position on the XY plane between the lenses 121 and 122 or a space between the lenses 121 and 122 may be adjusted to a designed value in order to reduce an optical loss caused by the deviation of the relative position or the space from the designed value. As a result, an optical system between the optical device 113 and the ferrule 130 may be adjusted with high accuracy, and a low-loss optical transmission may be accordingly performed between the optical device 113 and the ferrule 130.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An inter-lens adjusting method comprising:
    fitting a first fitting and fitted portion to a second fitting and fitted portion, the first fitting and fitted portion is provided on the side of a first lens, which includes a plurality of first lens portions arranged in a first straight line in such a manner that adjacent first lens portions of the plurality of first lens portions are in contact with each other and collimates light emitted from a light emitting device, and includes two first convex portions and two first concave portions and the second fitting and fitted portion is provided on the side of a second lens, which includes a plurality of second lens portions arranged in a second straight line in such a manner that adjacent second lens portions of the plurality of second lens portions are in contact with each other and aggregates the light collimated by the first lens, and includes two second concave portions to which the first convex portions are fitted, respectively, and two second convex portions which fit to the first concave portions, respectively; and
    adjusting a position between the first lens and the second lens such that the light emitted from the light emitting device is aggregated into an optical fiber ferrule via the first lens and the second lens,
    the first convex portions are provided on a first diagonal sandwiching the first straight line of the plurality of first lens portions and the first concave portions are provided on a second diagonal which intersects with the first diagonal obliquely sandwiching the first straight line of the plurality of first lens portions, the second convex portions are provided on a third diagonal sandwiching the second straight line of the plurality of second lens portions and the second concave portions are provided on a fourth diagonal which intersects with the third diagonal obliquely sandwiching the second straight line of the plurality of second lens portions.

2. The inter-lens adjusting method according to claim 1, wherein at least one of the first convex portions or at least one of the second convex portions has a shape which gets narrower as the corresponding convex portion gets closer to a tip of the corresponding convex portion, and wherein one of the second concave portions corresponding to the at least one of the first convex portions or one of the first concave portions corresponding to the at least one of the second convex portions has a shape which gets narrower as the corresponding concave portion gets closer to a tip of the corresponding concave portion.

3. The inter-lens adjusting method according to claim 2, wherein the corresponding convex portion has a spherical surface.

4. The inter-lens adjusting method according to claim 1, wherein a distance between a portion transmitting the light of the first lens and a portion transmitting the light of the second lens is adjusted by the dimension of each of the first fitting and fitted portion and the second fitting and fitted portion.

5. The inter-lens adjusting method according to claim 1, wherein the first lens is a transparent member integrally formed to include the first fitting and fitted portion, and wherein the second lens is a transparent member integrally formed to include the second fitting and fitted portion.

6. The inter-lens adjusting method according to claim 1, wherein the light emitting device emits the light toward an opening formed in a substrate on which the light emitting device is provided, and wherein the ferrule is formed on the substrate via the opening in parallel to a direction in which the light emitting device emits the light.

7. The inter-lens adjusting method according to claim 1, wherein:
the first fitting and fitted portion fits to the second fitting and fitted portion in a direction perpendicular to a surface of a board and the ferrule coupled to the second fitting and fitted portion extends in the direction.

8. An inter-lens adjusting method comprising:
fitting a first fitting and fitted portion to a second fitting and fitted portion, the first fitting and fitted portion is provided on the side of a first lens, which includes a plurality of first lens portions arranged in a first straight line in such a manner that adjacent first lens portions of the plurality of first lens portions are in contact with each other and collimates light emitted from an optical fiber ferrule, and includes two first convex portions and two second concave portions and the second fitting and fitted portion is provided on the side of a second lens, which includes a plurality of second lens portions arranged in a second straight line in such a manner that adjacent second lens portions of the plurality of second lens portions are in contact with each other and aggregates the light collimated by the first lens, and includes two second concave portions to which the first convex portions are fitted, respectively, and two second convex portions which fit to the first concave portions, respectively; and adjusting a position between the first lens and the second lens such that the light emitted from the ferrule is aggregated into a light receiving device via the first lens and the second lens,
the first convex portions are provided on a first diagonal sandwiching the first straight line of the plurality of first lens portions and the first concave portions are provided on a second diagonal which intersects with the first diagonal obliquely sandwiching the first straight line of the plurality of first lens portions,
the second convex portions are provided on a third diagonal sandwiching the second straight line of the plurality of second lens portions and the second concave portions are provided on a fourth diagonal which intersects with the third diagonal obliquely sandwiching the second straight line of the plurality of second lens portions.

9. The inter-lens adjusting method according to claim 8, wherein at least one of the first convex portion or at least one of the second convex portion has a shape which gets narrower as the corresponding convex portion gets closer to a tip of the corresponding convex portion, and wherein one of the second concave portions corresponding to the at least one of the first convex portions or one of the first concave portions corresponding to the at least one of the second convex portions has a shape which gets narrower as the corresponding concave get portion gets closer to a tip of the corresponding concave portion.

10. The inter-lens adjusting method according to claim 9, wherein the corresponding convex portion has a spherical surface.

11. The inter-lens adjusting method according to claim 8, wherein a distance between a portion transmitting the light of the first lens and a portion transmitting the light of the second lens is adjusted by the dimension of each of the first fitting and fitted portion and the second fitting and fitted portion.

12. The inter-lens adjusting method according to claim 8, wherein the first lens is a transparent member integrally formed to include the first fitting and fitted portion, and wherein the second lens is a transparent member integrally formed to include the second fitting and fitted portion.

13. The inter-lens adjusting method according to claim 8, wherein:
the first fitting and fitted portion fits to the second fitting and fitted portion in a direction perpendicular to a surface of a board and the ferrule coupled to the second fitting and fitted portion extends in the direction.

14. A photoelectric hybrid substrate comprising:
an optical device;
an optical fiber ferrule disposed to face the optical device;
a first lens disposed at a side of the optical device between the optical device and the ferrule, including a plurality of first lens portions arranged in a first straight line in such a manner that adjacent first lens portions of the plurality of first lens portions are in contact with each other and including a first fitting and fitted portion including two first convex portions and two second concave portions; and
a second lens disposed at a side of the ferrule between the optical device and the ferrule, including a plurality of second lens portions arranged in a second straight line in such a manner that adjacent second lens portions of the plurality of second lens portions are in contact with each other and including a second fitting and fitted portion including two second concave portions to which the first convex portions are fitted, respectively, and two second convex portions which fit to the first concave portions, respectively, the first convex portions are provided on a first diagonal sandwiching the first straight line of the plurality of first lens portions and the first concave portions are provided on a second diagonal which intersects with the first diagonal obliquely sandwiching the first straight line of the plurality of first lens portions, the second convex portions are provided on a third diagonal sandwiching the second straight line of the plurality of second lens portions and the second concave portions are provided on a fourth diagonal which intersects with the third diagonal obliquely sandwiching the second straight line of the plurality of second lens portions.

15. The photoelectric hybrid substrate according to claim 14, wherein the optical device is a light emitting device which emits light, the first lens collimates the light, and the second lens aggregates the collimated light into the ferrule.

16. The photoelectric hybrid substrate according to claim 14, wherein the optical device is a light receiving device which receives light, the second lens collimates light emitted from the ferrule, and the first lens aggregates the collimated light into the light receiving device.

17. The photoelectric hybrid substrate according to claim 14, wherein:

the first fitting and fitted portion fits to the second fitting and fitted portion in a direction perpendicular to a surface of a board and the ferrule coupled to the second fitting and fitted portion extends in the direction.

* * * * *